US008654497B2

(12) United States Patent
El Filali et al.

(10) Patent No.: US 8,654,497 B2
(45) Date of Patent: Feb. 18, 2014

(54) RESISTOR WITH THERMAL ELEMENT

(75) Inventors: Karim El Filali, Münster (DE); Ralf Schröder gen. Berhegger, Glandorf (DE)

(73) Assignee: Flextronics AP, LLC, Broomfield, CO (US)

( * ) Notice: Subject to any disclaimer, the term of this patent is extended or adjusted under 35 U.S.C. 154(b) by 222 days.

(21) Appl. No.: 13/012,975

(22) Filed: Jan. 25, 2011

(65) Prior Publication Data

US 2011/0188165 A1 Aug. 4, 2011

Related U.S. Application Data

(60) Provisional application No. 61/299,446, filed on Jan. 29, 2010.

(51) Int. Cl.
*H02H 5/04* (2006.01)

(52) U.S. Cl.
USPC .......................................... 361/103; 361/93.8

(58) Field of Classification Search
USPC ........................................ 361/93.8, 103, 104
See application file for complete search history.

(56) References Cited

U.S. PATENT DOCUMENTS

| | | | | |
|---|---|---|---|---|
| 5,198,791 | A * | 3/1993 | Shibayama et al. | 337/31 |
| 2002/0175800 | A1* | 11/2002 | Stanek et al. | 337/206 |
| 2003/0221430 | A1* | 12/2003 | Cook | 60/773 |
| 2007/0285867 | A1* | 12/2007 | Muench | 361/159 |

* cited by examiner

*Primary Examiner* — Danny Nguyen
(74) *Attorney, Agent, or Firm* — Haverstock & Owens LLP

(57) ABSTRACT

A current limiter and related methods to protect a switched-mode power supply from inrush current. The current limiter may include a resistive element electrically interconnected in series to a thermal element. The resistive element and the thermal element may be disposed about a single, unitary core. The resistive element may be in the form of a wire wound resistor wound about the core. The thermal element may be in the form of plated portion of the core. The thermal element may act as a thermal fuse to prevent overheating and unsafe failure of the resistive element in cases where excessive current passes through the resistive element. The thermal element may be configured to trip in a safe manner without sparking or creating exposed energized conductors. Thus the current limiter may be operable to limit inrush current while providing for safe failure modes.

14 Claims, 4 Drawing Sheets

RESISTOR WITH THERMAL ELEMENT

CROSS-REFERENCE TO RELATED APPLICATION

This application claims priority under 35 U.S.C. 119 to U.S. Provisional Application No. 61/299,446, entitled: "RESISTOR WITH THERMAL ELEMENT," filed on Jan. 29, 2010, the contents of which are incorporated herein as if set forth in full.

BACKGROUND

Electronic devices, such as computer equipment, may contain power supplies that are used to convert AC input to DC output. When such power supplies are first turned on, there may be a significant and potentially harmful (e.g., to components of the power supply) inrush of current. One way to protect against such potentially harmful inrushes of current is to place a resistor in line with the AC input to limit the inrush of current.

Such resistors will also dissipate power and thus generate a small amount of heat during normal operation. However, if abnormal operation occurs, such as the power supply drawing excessive current due to a short circuit, excessive heat may be generated in the resistor. Such heat may, for example, deform a housing of the resistor, a housing of the power supply, and/or damage other components proximate to the resistor. Such heat may, for example, cause a resistive element of the resistor (e.g., the wire in a wire wound resistor) to melt. Such melting may disconnect the power supply from the AC input. Such melting may occur, for example, at temperatures on the order of 1000° C. and result in the deformation of the housing of the resistor and/or a housing of the power supply, sparks, flames, the leaving of exposed components attached to the AC input, and/or other undesirable conditions.

One known solution is to place a thermal fuse in series with and adjacent to the resistor such that as the resistor heats, the heat is transferred to the thermal fuse. If the heat reaches a certain level, the thermal fuse is tripped, opening the circuit and preventing continued heating of the resistor, thus avoiding undesired heat, flames, sparks, melting insulation, exposed conductors, etc. However, such a system requires precise placement of the components. If the thermal fuse is too far from the resistor, the fuse may not trip at the desired temperature, possibly leading to unsafe failure of the resistor. If the thermal fuse is too close, the fuse may trip prematurely.

SUMMARY

In an aspect, a current limiter includes a core and a resistive element. The core includes a first portion and a second portion. The resistive element is disposed about the first portion of the core, and a thermal fuse is disposed about the second portion of the core. The thermal fuse is electrically interconnected in series with the resistive element.

The core of the current limiter may be a unitary core. In an embodiment, the current limiter may further include a first lead electrically interconnected in series with the resistive element, and a second lead electrically interconnected in series with the thermal fuse. The resistive element may be disposed between the first lead and the thermal fuse, and the thermal fuse may be disposed between the resistive element and the second lead.

The resistive element of the current limiter may include a wire wound about the first portion of the core. The thermal fuse may include one or more conductive layers disposed about the second portion of the core. The current limiter may include an interconnect that is electrically connected to the thermal fuse and to the resistive element, and the interconnect may be disposed between the thermal fuse and the resistive element. An outer insulation layer may surround the resistive element and the thermal fuse. At least a portion of the thermal fuse may have a melting point of between 140° and 500° C., such as 270° C. The resistive element may include a conductive layer disposed about the first portion of the core.

A method of making a current limiter includes plating a first portion of a core with a layer of conductive material, winding a wire around a second portion of the coil, electrically interconnecting the layer of conductive material to the wire, and positioning insulating material over the layer of conductive material and the wire. The second portion of the coil is free from the conductive material.

The method may include interconnecting an end cap to the first portion of the core, such that the layer of conductive material is electrically interconnected to the end cap.

In a method for increasing a resistance value of a component of an electronic circuit, the method may include passing a current through a resistive element disposed about a first portion of a core, transferring heat generated during the passing step along a longitudinal axis of the core to a thermal fuse disposed about a second portion of the core, and melting a portion of the thermal fuse to increase a resistance of the thermal fuse in response to the transferring step.

In the method for increasing a resistance value of a component of an electronic circuit, the melting step may increase the resistance of the thermal fuse from less than 1 ohm to at least 2 mega ohms. In the method, the melting step may occur when the temperature of the thermal fuse reaches a temperature between 250° and 270° C.

In another aspect, a current limiter includes a core comprising a first portion and a second portion, a resistive element disposed about the first portion of the core, and a thermal fuse disposed along the second portion of the core. The thermal fuse is electrically interconnected in series with the resistive element.

The current limiter may further include an outer insulation layer surrounding the resistive element and the thermal fuse. The core of the current limiter may be a unitary core. The resistive element may include a wire wound about the first portion of the core. The thermal fuse may include a solder joint disposed between a lead of the current limiter and the resistive element. The solder joint may have a melting point of between 230° and 270° C.

DETAILED DESCRIPTION

Figure 1:
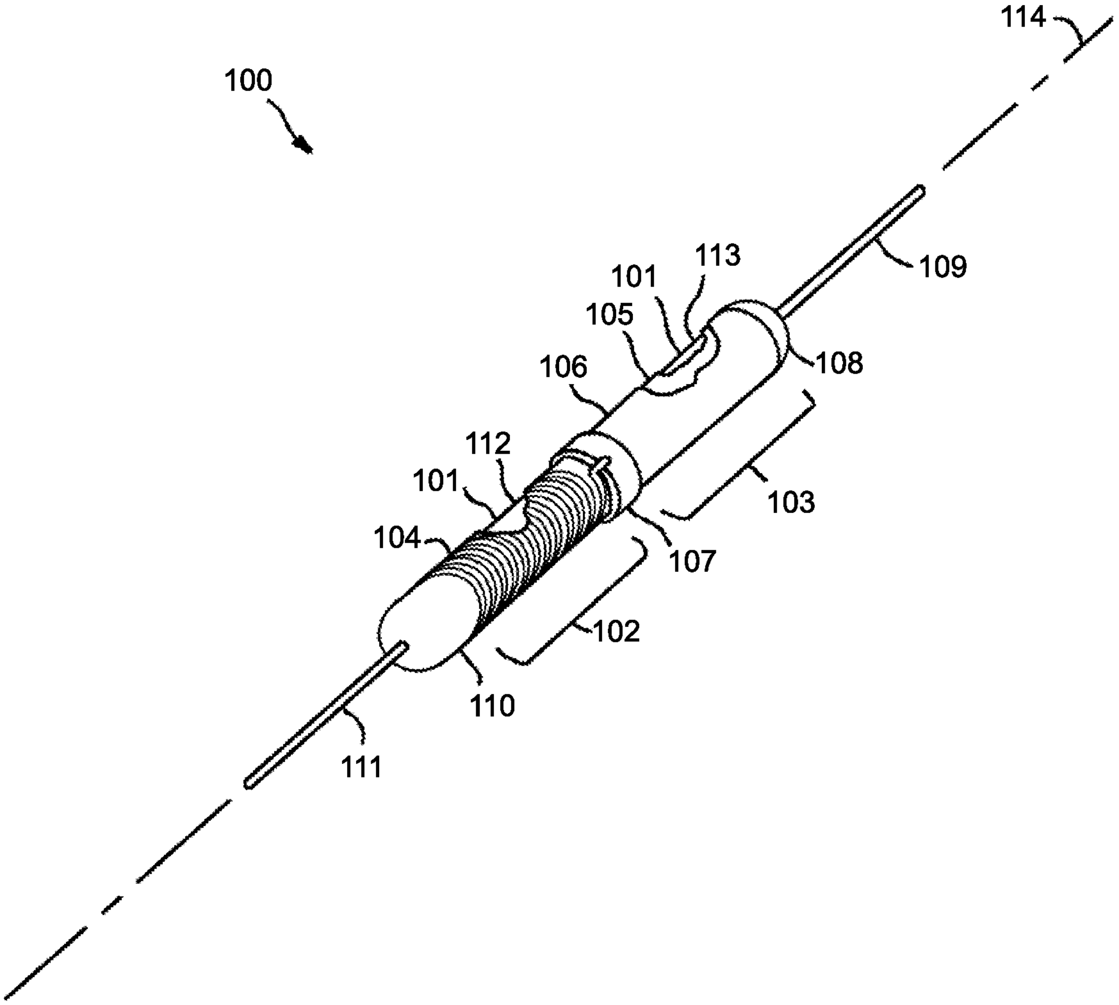
FIG. 1 is an illustration of an exemplary embodiment of a resistor with a thermal element.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope and spirit of the invention.

The aforementioned problems and other problems are solved by the features described herein by providing a resistor with a thermal element that is operable to function as a current limiter to adequately limit current spikes while also providing protection against longer duration current flows in excess of desired levels. For example, the resistor with thermal element may be deployed as an inrush current limiter for a switched-mode power supply (e.g., for a computer). In such an application, the resistor with thermal element may provide inrush protection as power is applied to the switched-mode power supply by virtue of the resistance of a resistive element. Additionally, the resistor with thermal element may include a thermal element (e.g., fuse) that will deploy (e.g., increase in resistance and/or become open) if excessive current is passed through the resistor with thermal element for an extended period of time. Advantageously, the embodiments described herein may provide low-cost, reliable inrush and overheating protection for electronic equipment, while also providing a safe failure mode wherein, when the thermal element is deployed, no sparks or flames are produced and no exposed electrical conductors are created. Specific features and variations of the embodiments are described in detail below with reference the accompanying figures.

FIG. 1 illustrates an embodiment of a resistor with thermal element 100 that may, for example, be used as an inrush current limiter in a switched-mode power supply. An insulation layer 115 (shown in FIG. 2) is not shown in FIG. 1. The resistor with thermal element 100 includes a core 101. The core 101 may be constructed from electrically insulating materials, such as a ceramic. The core 101 may provide a non-conductive, mechanical support for the resistor with thermal element 100. In this regard, a resistive element 102 and a thermal element 103, both of which are discussed below, may each rely on the core 101 for mechanical support. Relatedly, the core 101 may comprise a first portion 112 that is located proximate to, and provides support for, the resistive element 102, and a second portion 113 that is located proximate to, and provides support for, the thermal element 103. The first 112 and second 113 portions may be exclusive from each other (e.g., no portion of the first portion 112 may be included in the second portion 113) and may be disposed along exclusive portions of a longitudinal axis 114 of the resistor with thermal element 100. The first 112 and second 113 portions may be portions of a single unitary core 101. Alternatively, the first 112 and second 113 portions may be portions of a single core 101 that is constructed by interconnecting separately manufactured first 112 and second 113 portions.

The resistive element 102 may be in the form of a wire wound resistor that includes a wire 104 that is wound around the first portion 112 of the core 101. The diameter, length, and material of the wire 104 may be selected to achieve particular electrical characteristics, such as any appropriate electrical resistance and wattage rating. For example, the wire 104 may be configured such that the resistive element 102 has a selected electrical resistance between about 1 ohm and 10 kilo ohms. For example, the wire 104 may be configured such that the resistive element 102 has an electrical resistance of about 10 ohms (e.g., 10 ohms+/−5% or 9.5-10.5 ohms) and is rated to handle 1 W of power. The resistive element 102 may alternatively be in the form of a film resistor or any other appropriate type of resistor disposed about the first portion 112 of the core 101. For example, the resistive element 102 may include one or more conductive layer disposed about the first portion 112 of the core 101.

The resistive element 102 may function to limit current. For example, where the resistive element is disposed within a switched-mode power supply, an inrush current may occur when the switched-mode power supply is first turned on. For such an application, the resistive element 102 may be configured to withstand the initial voltage and current stresses which occur when the switched mode power supply is first switched on. By limiting inrush current, the resistive element 102 may help to protect other components of the switched mode power supply from potentially damaging current levels. In this regard, the resistive element 102 may help prevent components within the switched mode power supplies from, for example, sparking, overheating, or other damage.

The resistive element 102 may have a relatively high value of resistance to provide adequate current protection. Such a high value of resistance will be dissipative under normal operating conditions. Potentially, under conditions where a higher than desired current flows through the resistive element 102, the resistive element 102 may produce an undesired amount of heat. Such heating may lead to damage to the resistive element 102 such as, melting and/or burning portions of the resistive element 102 that may cause unsafe conditions. Such heating may also lead to damage to components proximate to the resistor with thermal element 100, such as, for example, a power supply housing (not shown). Accordingly, the resistor with thermal element 100 may include the thermal element 103 to prevent such unsafe conditions. In this regard, by coupling the thermal element 103 to the resistive element 102, the resistor with thermal element 100 may function both as an inrush current limiter and as fuse.

The thermal element 103 may be disposed about the second portion 113 of the core 101. The second portion 113 of the core 101 may provide a surface for deposition of one or more layers or films of conductive material that may in turn make up the thermal element 103. The thermal element 103 may be a conductive element that is connected to the resistive element 102 in series. The thermal element 103 may be configured such that it will act as a thermal fuse and change from an electrically conductive element to an open (e.g. nonconductive) element upon exposure to a predetermined temperature. The predetermined temperature may be selected by appropriately configuring various layers and/or materials of the thermal element 103. For example, in an exemplary embodiment, the thermal element 103 may be configured such that when the thermal element 103 is exposed to a selected temperature that is between about 140° C. and about 500° C., the thermal element 103 will change from an electrically conductive element to an open element thus causing current flow through the resistor with thermal element 100 to cease. In another example, the thermal element 103 may be configured such that when the thermal element 103 is exposed to a temperature of about 260° C., the thermal element 103 will change from an electrically conductive element to an open element thus causing current flow through the resistor with thermal element 100 to cease.

The thermal element 103 may include one or more layers of film deposited directly onto the outer surface of the second portion 113 of the core 101. The one or more layers of film may be configured such that, upon exposure to a selected temperature, portions of the one or more layers of film of the thermal element 103 will melt in such a manner that the electrical interconnection between the resistive element 102 and a first end cap 108 disposed at an opposite end of the thermal element 103 from the resistive element 102 is interrupted (e.g., such that the resistance of the thermal element

103 increases to at least 2 mega ohms). The selected temperature may be achieved by choosing appropriate film layer thickness and materials to achieve the selected temperature. As illustrated in FIG. 1, the thermal element 103 may, for example, include a first layer 105 (e.g., an innermost layer) of film deposited directly onto the outer surface of the second portion 113 of the core 101. The thermal element 103 may further include a second layer 106 of film deposited over the first layer 105. For example, the first layer 105 may comprise nickel plating and the second layer 106 may comprise tin plating. Other appropriate materials and layers in addition to and/or in place of the nickel and tin layers may be utilized in the thermal element 103. The thermal element 103 may have a relatively low resistance. For example, the thermal element 103 may have a resistance of less than 0.1 ohm.

The wire 104 of the resistive element 102 may be directly interconnected to the thermal element 103. Alternatively, an intermediate member 107 may be disposed between the resistive element 102 and the thermal element 103. The intermediate member 107 may be in the form of a band disposed about at least a portion of the circumference of the core 101 in the region between the first portion 112 and the second portion 113. In this regard, the intermediate member 107 may be electrically connected to the thermal element 103 about at least a portion of the circumference of the core 101. The wire 104 of the resistive element 102 may be electrically connected to the intermediate member 107 at a point where the wire 104 is, for example, welded or soldered to the intermediate member 107. By electrically interconnecting to the thermal element 103 along at least a portion of the circumference of the core 101, any heat flowing from the wire 104 may flow through the intermediate member 107 and thus may be relatively distributed about the portion of the circumference of the core 101. Accordingly, the concentration of heat flow at the connection point that could occur if the wire 104 were directly connected to the thermal element 103 may be avoided. Likewise, current density through the layers of the thermal element 103 may be more uniformly distributed then would occur if the wire 104 were connected directly to the thermal element 103.

As noted, a first end cap 108 may be interconnected to the thermal element 103. This may in turn be interconnected to a first lead 109. The first lead 109 may allow the resistor with thermal element 100 to be interconnected to various other components such as a printed wiring board (PWB). Additionally, the resistor with thermal element 100 may include a second end cap 110. The second end cap 110 may be disposed at an opposite end of the resistor with thermal element 100 from the first end cap 108. A second lead 111 may be electrically connected to the second end cap 110. Current flowing through the resistor with thermal element 100 may, for example, flow in order through the second lead 111, through the wire 104 of the resistive element 102, through the intermediate member 107, through the layers 105, 106 of the thermal element 103, through the first end cap 108, and through the first lead 109. The second end cap 110 may be a conductive member electrically interconnected to the wire 104 and the second lead 111. Alternatively, the second end cap 110 may be a cover that covers an interconnection directly between the second lead 111 and the wire 104. In either case, the second end cap 110 may also serve to secure the wire 104 to the resistor with thermal element 100.

As illustrated in FIG. 1, the resistive element 102 may be disposed between the second lead 111 and the thermal element 103. The thermal element 103 may be disposed between the resistive element 102 and the first lead 109. As illustrated, the resistor with thermal element 100 may be configured as an elongated component with the first lead 109 and the second lead 111 disposed on opposing ends of the elongated component. In an arrangement, the leads 109, 111 of the resistor with thermal element 100 may be bent at 90° with respect to the longitudinal axis 114 in the same direction such that when the resistor with thermal element 100 is inserted into a PWB, the longitudinal axis 114 is parallel to the plane of the PWB. In another configuration, one of the leads 109, 111, such as the first lead 109, may be bent 180° from as shown in FIG. 1 such that an end portion of the first lead 109 is proximate to and parallel to the second lead 111. Such a configuration may be inserted into a PWB such that the longitudinal axis 114 is perpendicular to the plane of the PWB.

Figure 2:
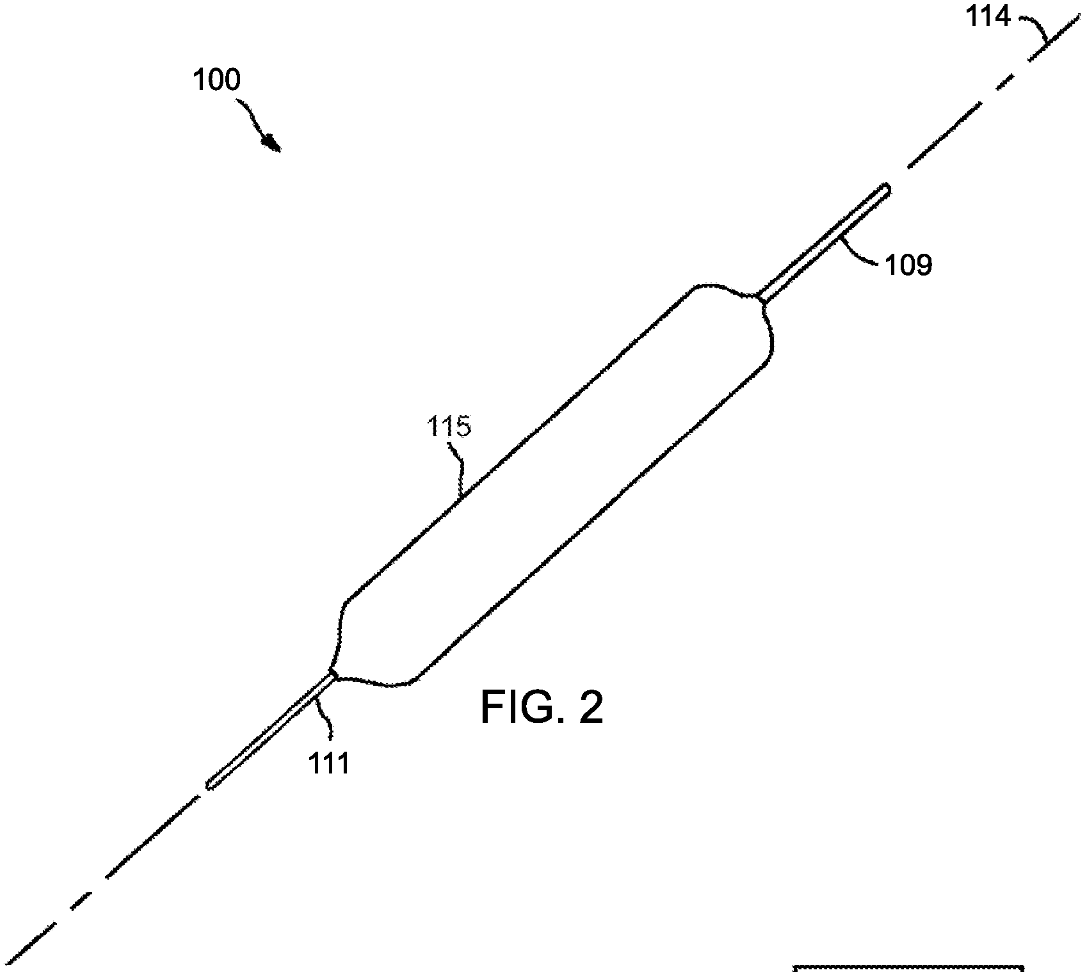
FIG. 2 is an illustration of the resistor with thermal element of FIG. 1 with an insulating coating.

FIG. 2 is an illustration of the resistor with thermal element 100 of FIG. 1 with the insulation layer 115 shown. The insulation layer 115 may be disposed over the resistive element 102, thermal element 103, and all other components of the resistor with thermal element 100 except for portions of the first 109 and second 111 leads. The insulation layer 115 may, for example, comprise a protective coating, such as a protective lacquer, deposited on the outer surfaces of the resistive element 102, intermediate member 107, thermal element 103, first end cap 108, and second end cap 110.

Figure 3:
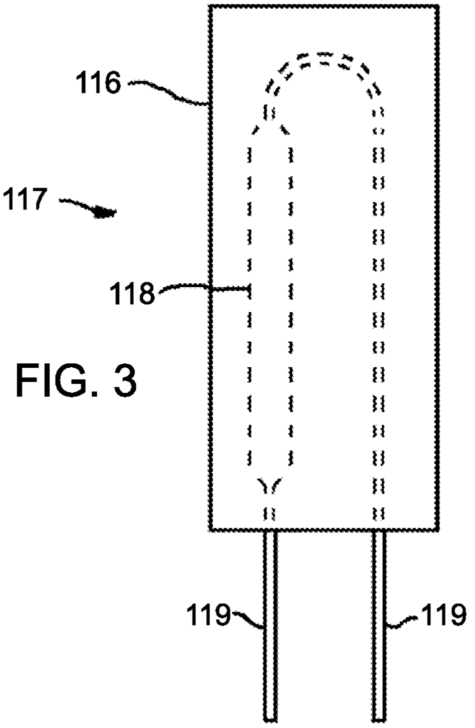
FIG. 3 is an illustration of another exemplary embodiment of a resistor with a thermal element.

FIG. 3 is an illustration of another exemplary embodiment of a resistor with a thermal element 117. In this alternative embodiment, the resistor with thermal element 117 may comprise a case 116 disposed about a component 118. The component 118 may include the members of the resistor with thermal element 100 shown in FIG. 1 that are disposed between the first 109 and second 111 leads, such as the second end cap 110, the resistive element 102, the intermediate member 107, the thermal element 103, and the first end cap 108. An electrically insulating material may be disposed within the case 116 and surrounding the component 118 and a pair of leads 119. The electrically insulating material may, for example, be a cement, an epoxy, or any other appropriate electrically insulating material. The electrically insulating material may secure the component 118 relative to the case 116. The case 116 may be ceramic. As illustrated in FIG. 3, the leads 119 may be configured such that they extend from a common surface of the resistor with thermal element 117. In an alternative embodiment, the leads 119 may be formed such that they extend from opposite ends of the case 116.

Returning to FIG. 1, a method of manufacturing the resistor with thermal element 100 will now be discussed. A first step in the process of manufacturing the resistor with thermal element 100 may be to plate the second portion 113 of the core 101 to form the first layer 105. The plating may be in the form of one or more layers deposited onto the second portion 113 to form the thermal element 103. This may be followed by winding the wire 104 about the first portion 112 of the core 101. In embodiments where an intermediate member 107 is included, the next step may be to install the intermediate member 107 between the first portion 112 and the second portion 113 and electrically connect the wire 104 to the intermediate member 107 and electrically interconnected the intermediate member 107 to the thermal element 103. In cases where an intermediate member 107 is not included, the next step may be to electrically interconnect the wire 104 directly to the thermal element 103.

The first end cap 108 may then be interconnected to the thermal element 103 and the second end 110 may be installed on the opposing end of the core 101. After the appropriate electrical interconnections of portions of the resistor with thermal element 100 have been completed, a next step may be to position an insulating material over the components of the resistor with thermal element 100 illustrated in FIG. 1, except for portions of the first lead 109 and the second lead 111, to form the resistor with thermal element 100 as illustrated in FIG. 2. Alternatively, after the appropriate electrical interconnections of the portions of the resistor with thermal element 100 as illustrated in FIG. 1 have been completed, the portions may be positioned within the case 116 and the case 116 may be filled with cement or other insulating material to secure the components within the case 116 to produce the resistor with thermal element 117 as illustrated in FIG. 3. The above described steps may be performed in any appropriate order.

Figure 4:
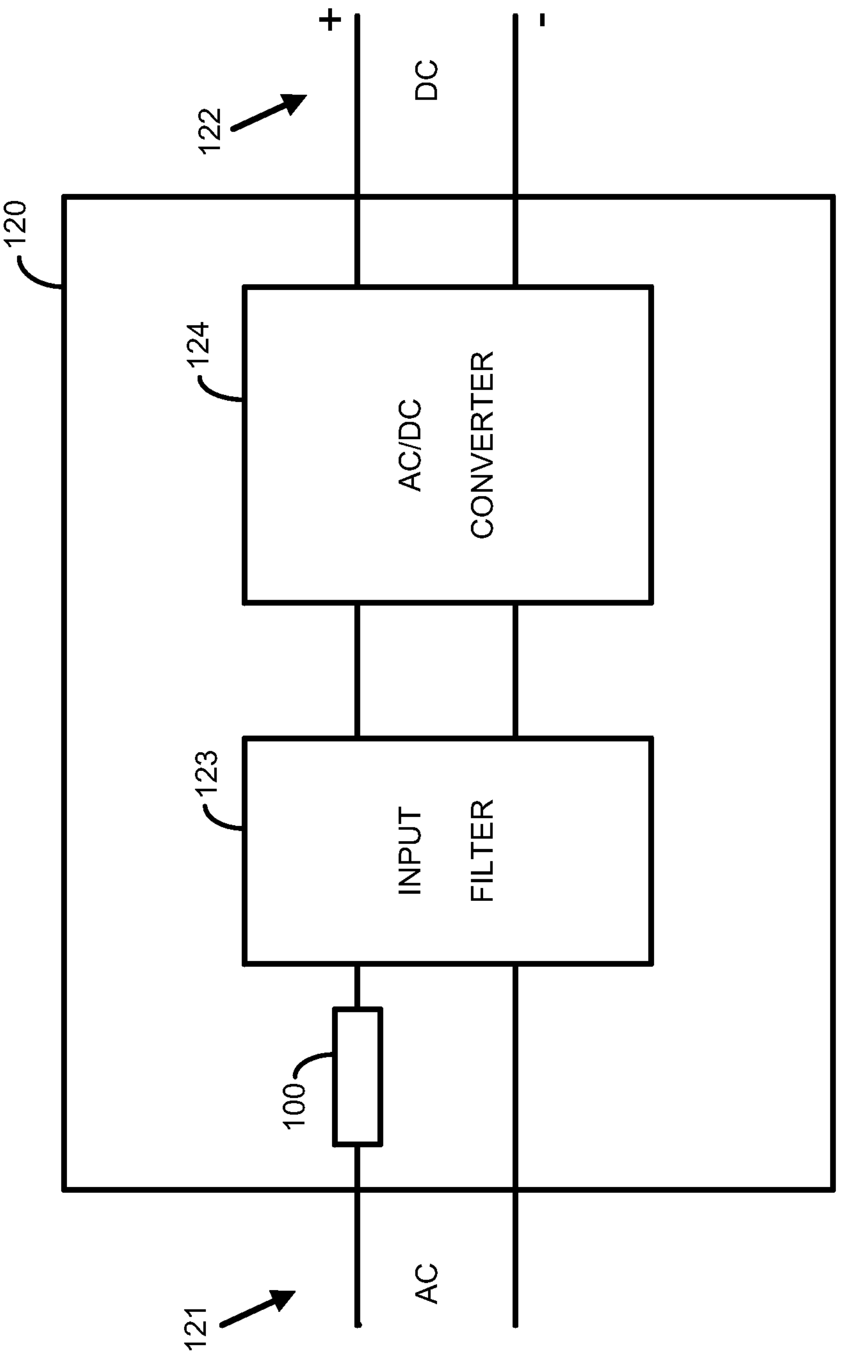
FIG. 4 is a schematic illustration of a switched-mode power supply incorporating a resistor with a thermal element.

An exemplary application using the resistor with thermal element 100 within a switched-mode power supply 120 will now be described with reference to FIG. 4. The switched-mode power supply 120 is operable to convert an AC input 121 to a DC output 122. The resistor with thermal element 100 may be disposed between the AC input 121 and an input filter 123. An AC/DC converter 124 is interconnected to the input filter 123 and converts a filtered AC input 121 to the DC output 122. Upon initial power up of the switched-mode power supply 120, a relatively large inrush current may be drawn by the AC/DC converter 124 as capacitors within the AC/DC converter 124 charge. Under such circumstances, the resistance of the resistor with thermal element 100 may limit the inrush current such that it is not detrimental to other components of the switched-mode power supply 120. Moreover, the resistor with thermal element 100 may also reduce the negative effects of any current spikes that may occur at the AC input 121 in the same manner. In such circumstances, insufficient heat may be generated in the resistive element 102 to affect the thermal element 103.

Under certain circumstances (e.g., a failure, such as a short circuit, within the AC/DC converter 124), a higher than desired level of current may flow through the resistor with thermal element 100. Under such circumstances, heat may build up in the resistor with thermal element 100.

Without the thermal element 103, such heat buildup could lead to unacceptable failure modes of the resistor with thermal element 100 such as melting components (e.g., such as the wire 104 and/or insulation 115), sparking, ignition, and/or any failure mode that could result in energized and exposed conductors. For example, as previously noted, the wire 104 may melt at a temperature on the order of 1000° C. In an embodiment, a housing of the switched-mode power supply 120 may be made from a plastic with a melting temperature on the order of 200° C. Accordingly, without the thermal element 103, if the temperature of the wire 104 exceeds 200° C. due to the higher than desired level of current, but remains below 1000° C., the wire 104 may remain intact (e.g., remain not melted), and heat may flow from the wire 104 to surrounding components. Such a flow of heat could cause deformation (e.g., melting) of the plastic power supply housing. Such a flow of heat could also cause damage to other components proximate to the wire 104.

With the thermal element 103, the resistor with thermal element 100 may be configured to advantageously stop such heating of the wire 104 by triggering the thermal element 103 at a predetermined temperature (e.g., at a selected temperature between 140° C. and 500° C. such as 200° C.), thus preventing or limiting such damage.

Moreover, the resistor with thermal element 100 may be configured such that it fails in a safe manner (e.g., no energized and exposed conductors, no sparks, no ignition). In an exemplary configuration, the resistive element 102 may be rated for one watt. In such a configuration, if two watts of power are drawn through the resistor with thermal element 100, the resistive element 102 may generate heat that in turn raises the temperature of the thermal element 103 such that a portion of the thermal element 103 melts, resulting in severing the electrical connection between the first end cap 108 and the resistive element 102 and stopping the flow of current through the resistor with thermal element 100.

For example, when a higher than desired level of current flows through the resistor with thermal element 100, the heat generated as the current passes through the wire 104 may flow along the longitudinal axis 114 and raise the temperature of the thermal element 103. This heat transfer may occur, for example, through the electrical conductive pathway between the resistive element 102 and the thermal element 103, through the core 101, and/or through the insulation layer 115 surrounding the resistive element 102 and the thermal element 103. As heat flows from the resistive element 102 to the thermal element 103, the temperature of the thermal element 103 may rise. Once the temperature of the thermal element 103 reaches a predetermined level, portions of the thermal element 103 may melt, causing a break in the conductive material of the thermal element 103 such that the flow of current through the resistor with thermal element 100 is stopped. Such melting may occur without the generation of sparks or exposure of otherwise insulated conductors. In this regard, the resistor with thermal element 100 may fail in a safe manner where no excessive heat is produced, no sparks are generated, and no exposed conductors are created. Accordingly, other components within the switched-mode power supply 120 may be protected from excessive current.

Although the resistor with thermal element 100 is shown positioned at the input to the input filter 123, the resistor with thermal element 100 may be place in any appropriate place, including, for example, placing multiple resistor with thermal elements 100 within the AC/DC converter 124.

Figure 5:
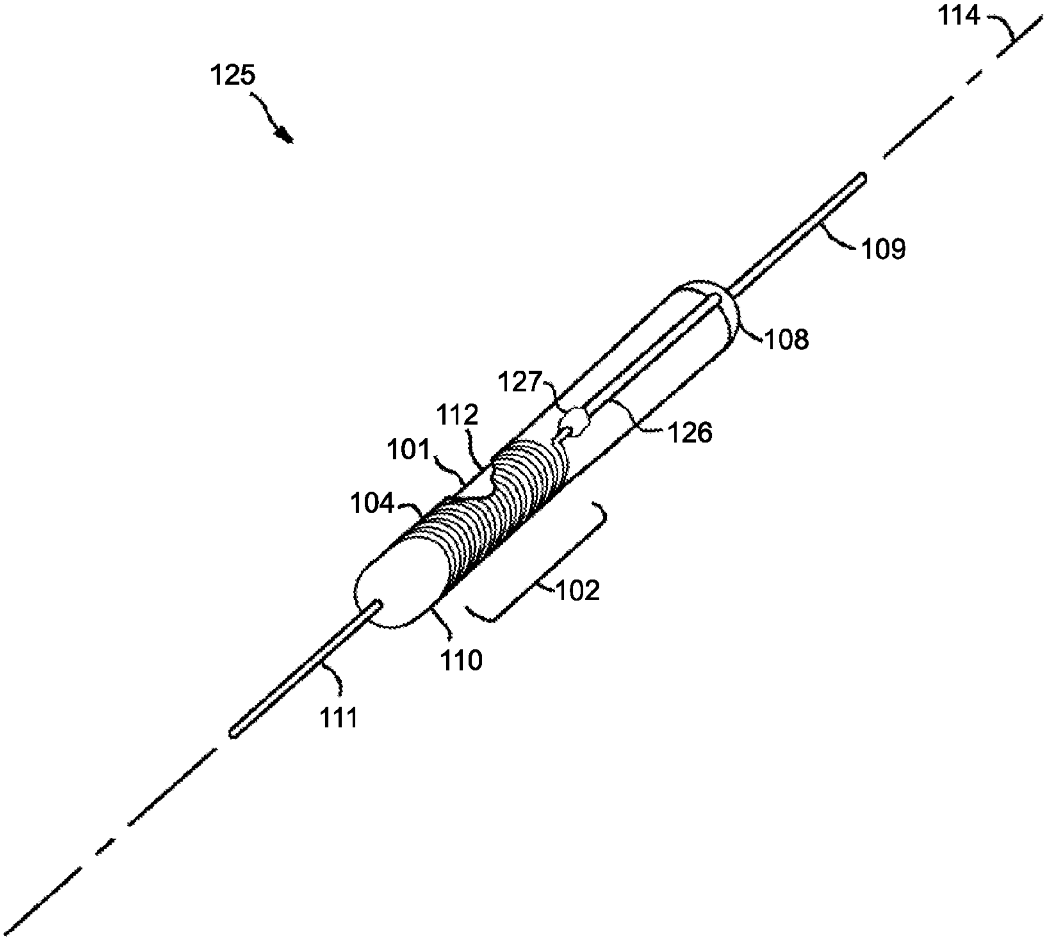
FIG. 5 is an illustration of another exemplary embodiment of a resistor with a thermal element.

In an alternative construction, a resistor with thermal element 125, illustrated in FIG. 5, may include a wire 126 substituted for the plated portion (e.g., first 105 and second 106 layers) and intermediate member 107 of the resistor with thermal element 100 of FIG. 1. A first end of the wire 126 may be directly connected to the first lead 109 or to the first end cap 108 if present. A second end of the wire 126 may be interconnected to the resistive element 102 through a solder joint 127. The solder joint 127 may be configured such that, upon reaching a predetermined temperature (e.g., between 230° and 270° C.), at least a portion of the solder joint 127 may melt such that the electrical connection between the wire 126 and the resistive element 102 is broken, thus providing a thermal fuse.

Embodiments of the resistor with thermal elements 100, 117, 125 offer numerous advantages over existing resistive inrush current limiting devices. One advantage is that, as opposed to a system where the resistive element and thermal elements are each on distinct cores, the entire resistor with thermal element 100 may be made using a single core. This eliminates handling and assembly steps related to having elements on separate cores. Using one core also reduces overall device size since the direct interconnection (or interconnection through the intermediate member 107) of the resistive element 102 and the thermal element 103 may take up less space than joining together separate resistive and thermal elements (e.g., by contacting and welding their leads together). The resistor with thermal element 100 may be configured as a cylindrical part with leads extending out of the cylinder ends (see FIG. 2). By virtue of their being fixed to the same core, the positioning of the resistive element 102 relative to the thermal element 103 may be beneficially repeatable and thus the heat transfer mechanism between the resistive element 102 and thermal element 103 may be beneficially repeatable, leading to a more reliable resistor with thermal element 100. This is opposed to systems where a resistor is placed close to a separate thermal fuse where variations in the distance between the components may result in performance variations (e.g., variation in current levels required to cause the thermal fuse to open). Also, a single core resistor with thermal element 100 requires only two end caps, wherein systems with separate resistive and thermal elements may require 4 end caps. Finally, the resistor with thermal element 100 may be made such that it is lead-free.

While the invention has been illustrated and described in detail in the drawing and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

The invention claimed is:

1. A current limiter comprising:

a core comprising a first portion and a second portion;

a resistive element disposed about the first portion of the core;

a thermal fuse disposed about the second portion of the core, wherein the thermal fuse is electrically interconnected in series with the resistive element, wherein the thermal fuse comprises at least one conductive layer disposed about the second portion of the core; and an interconnect, wherein the interconnect is electrically connected to the thermal fuse and to the resistive element, wherein the interconnect is disposed between the thermal fuse and the resistive element, and wherein the interconnect is electrically connected to the at least one conductive layer of the thermal fuse about a majority of a circumference of the core to distribute any heat flowing from the resistive element to the at least one conductive layer of the thermal fuse about the circumference.

2. The current limiter of claim 1, wherein the core is a unitary core.

3. The current limiter of claim 2, further comprising:

a first lead electrically interconnected in series with the resistive element; and a second lead electrically interconnected in series with the thermal fuse, wherein the resistive element is disposed between the first lead and the thermal fuse, and wherein the thermal fuse is disposed between the resistive element and the second lead.

4. The current limiter of claim 3, wherein the resistive element comprises a wire wound about the first portion of the core.

5. The current limiter of claim 1, wherein the thermal fuse comprises a plurality of conductive layers disposed about the second portion of the core.

6. The current limiter of claim 1, further comprising an outer insulation layer surrounding the resistive element and the thermal fuse.

7. The current limiter of claim 6, wherein at least a portion of the thermal fuse has a melting point of between 140° and 500° C.

8. The current limiter of claim 7, wherein at least a portion of the thermal fuse has a melting point of less than 270° C.

9. The current limiter of claim 3, wherein the resistive element comprises a conductive layer disposed about the first portion of the core.

10. A current limiter comprising:

a core comprising a first portion and a second portion;

a resistive element disposed about the first portion of the core; and a thermal fuse disposed along the second portion of the core, wherein the thermal fuse is electrically interconnected in series with the resistive element, wherein the thermal fuse comprises:

a wire disposed along the second portion of the core; and a solder joint electrically interconnected in series with the wire and the resistive element and configured to melt upon reaching a predetermined temperature to break the electrical interconnection between the wire and the resistive element;

a first lead electrically interconnected in series with the resistive element; and a second lead electrically interconnected in series with the wire; and an outer insulation layer adhered to the entire surface of the resistive element and the thermal fuse such that the outer insulation layer encases the resistive element and the thermal fuse.

11. The current limiter of claim 10, wherein the core is a unitary core.

12. The current limiter of claim 11, wherein the resistive element comprises a wire wound about the first portion of the core.

13. The current limiter of claim 10, wherein the predetermined temperature is between 230° and 270° C.

14. The current limiter of claim 1, wherein the conductive layer of the thermal fuse is plated about the second portion of the core.

* * * * *